3,540,974
PROCESS FOR MAKING DECORATED SHEET
MATERIALS AND PRODUCT
Jack M. Broadhurst, Mishawaka, Ind., assignor to Uniroyal, Inc., New York, N.Y., a corporation of New Jersey
Filed Apr. 23, 1968, Ser. No. 723,373
Int. Cl. D04h 11/00; B44c 1/08
U.S. Cl. 161—64                                             10 Claims

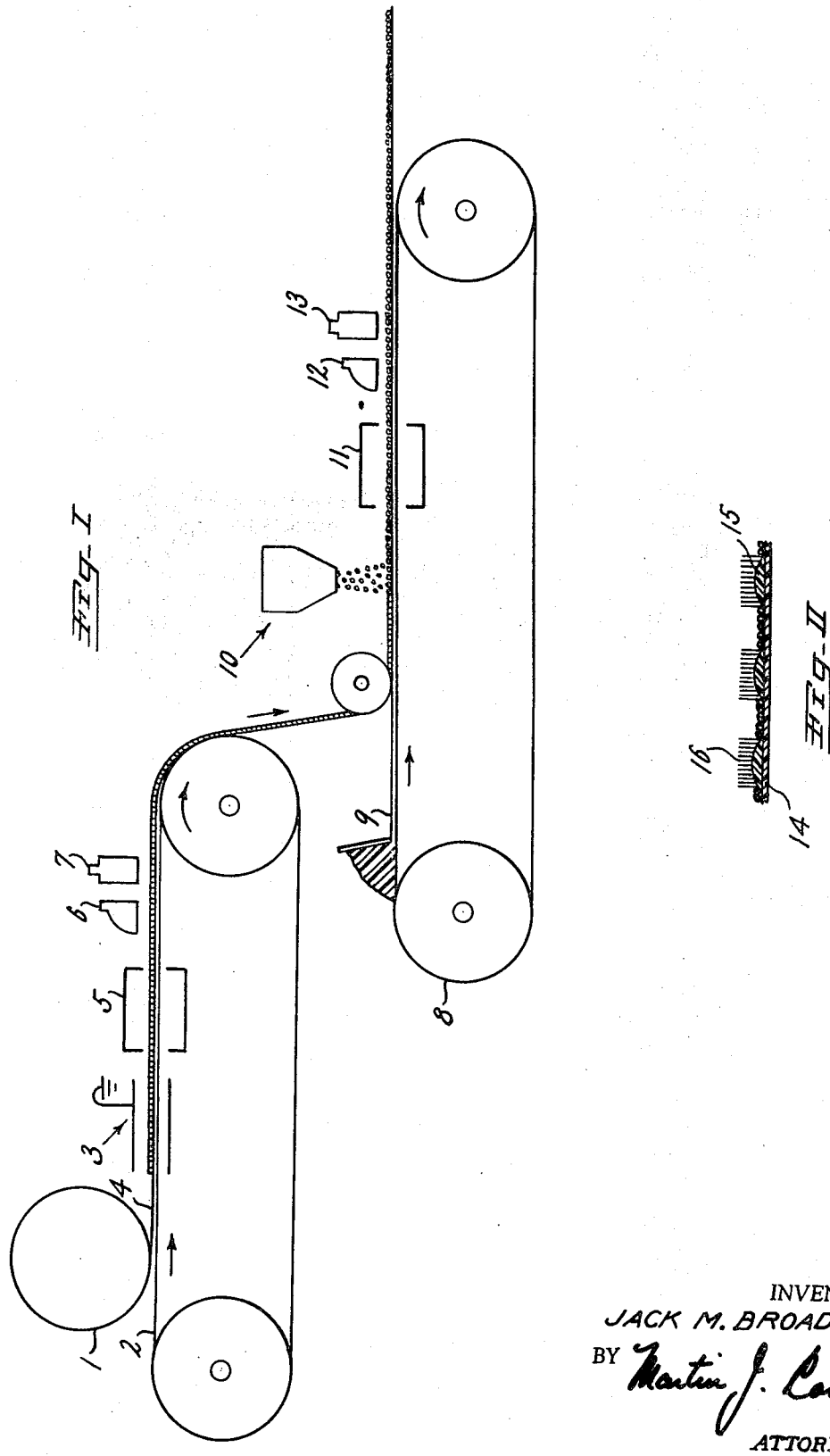

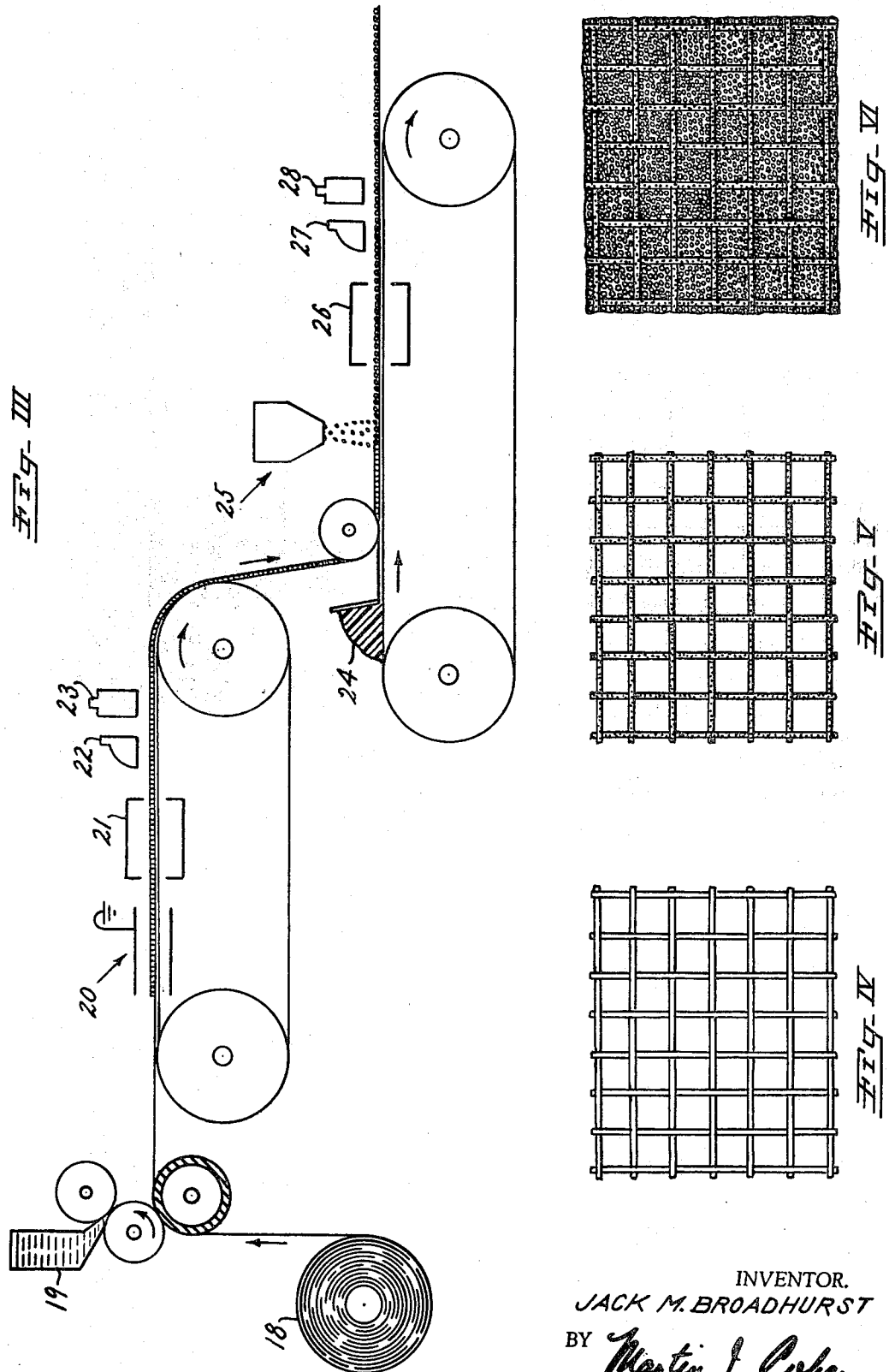

ABSTRACT OF THE DISCLOSURE

The invention resides in the production of a patterned flock and plastic granule material produced without resorting to grid-like shield members. The pattern is effected by first depositing a liquid, plastic material on a continuous belt in an uninterrupted pattern containing a plurality of spaced open portions. Thereafter, the wet plastic design is flocked, heated, if necessary, so that it is partially fused or cured, and then this flocked component is passed onto a second releasable belt which has been prepared with a film of liquid plastic material. The entire composite is sprinkled with plastic resin granules, whereby the application of plastic granules adheres only to those exposed surfaces of the second plastic layer. Lastly, the entire composite is passed through a final heating stage wherein the first flocked component is united to the second layer, and the flock material and plastic granules are securely set.

---

The invention relates to the process of producing a flock and plastic resin granule sheet material, exhibiting the desired properties of both components, without resorting to the use of conventional grid-like shield members to effect the pattern. The products produced by this process may display intricate designs wherein the borders between differing property areas are sharply delineated. The potential uses of this novel process are unlimited, a fact that will become apparent as the various aspects of the invention are unfolded; however, it is evident that the process has a variety of applications particularly in the floor covering industry and in automotive floor covering.

My invention may be practiced as a continuous process wherein the various steps are performed on a continuous carrier equipped with a releasable surface. The releasable surface (or casting paper surface) is well known in the industry, and consists of a base web of paper over which a coating of a material imparting a smooth, hard texture non-adherent to the plastic material has been applied. Such coating materials as melamine, modified alkyds, varnish, nitrocellulose, and casein allow for the simple removal of moist or tacky substances and cured, cooled or fused materials from the carrier surface.

The first step of my invention entails the deposition of a heat settable plastic or thermoplastic resinous material in a predetermined pattern containing a plurality of spaced open portions on the aforementioned continuous belt.

I have determined that the process is best practiced utilizing a thermoplastic resinous material in a thixotropic state, or a thermosetting compound displaying increased viscosity due to the addition of fillers or thickening agents; and that the desired pattern should be designed from a *plastic* material displaying this thickened form. The thixotropic or thickened character of the plastic will provide a textured effect in the finished product, and will also insure the establishment of a clear, sharp, fine lined design. The almost solid character of the material will prevent the pattern from altering its shape by "running" or spreading, once it has been applied; however, it will continue to be receptive to a fiber being imbedded in its surface.

The plastic is preferably comprised of a vinyl plastisol as represented by vinyl chloride homopolymer or copolymers of vinyl chloride with such copolymerizable monomers as vinyl acetate and the like, or polyurethane composition; however, any number of materials may be substituted. Among these, epoxy polysulfide rubber, epoxy polyamide, polyvinyl acetate, flexible acrylic resins and liquid pourable silicone rubber are a few of the more acceptable plastics. The plastic is deposited in an uninterrupted pattern on the carrier by means of a stencil, an intaglio roll, nozzle type unit, or equivalent dispensing device. The depth of the plastic is governed by the properties of the fiber to be subsequently embedded therein, as well as the proposed utility of the final material; however, it has been determined that a depth of from about .010 inch to about .125 inch is practical for my purposes.

At this point, flock, particulate material or fiber of a desired color, length, and coarseness is applied to the plastic by any conventional means. It has been found that electrostatic flocking achieves a superior result; however, the beater bar technique is also acceptable, although it often causes "flow out" in the patterned component. While still supported on the releasable carrier surface the flocked plastic is gelled, partially or completely fused, cooled, any excess fiber not adhering to the plastic is then removed by vacuum cleaning, or other appropriate methods, and the flocked component is removed from the surface without rupturing. Now, the flocked component is passed onto a second, continuous, releasable belt which has been provided with an uninterrupted layer of heat settable or thermoplastic resinous material. Ordinarily, this layer of plastic is applied by means of a doctor knife, which can be regulated to yield a uniform film. Generally, it is desirable to employ this resinous film in a depth of at least 5 mils, while a preferred thickness of from 10 to 25 mils is recommended. This base layer must be of sufficient depth and consistency to support the first flocked design component and also to support a subsequent application of plastic granules. After the flocked plastic component from the primary operation is superimposed on the wet surface of the plastic layer, the entire composite is sprinkled with plastic resin granules from a mechanical sifter or any conventional sprinkling device; e.g. a chute, shaker or screen. Since the flocked component of the first step had been embedded in the wet plastic layer, the plastic granules applied in the second operation can only adhere to those expected wet plastic areas showing through the total composite. This technique therefore achieves a distinct two phased system. After passing the material through a final heating unit, the material is cooled, and all excess flock or particles i.e. any fiber or plastic particles not adhering to the plastisol layer, are cleaned from the surface by a brushing operation. Upon passage through the heater, the initial flocked component is fused to the second plastic layer, and all the flock and plastic granules which had been applied in both applications are securely set in their respective foundation layers.

Another aspect of my invention entails the use of an open mesh plastic coated fabric to develop the flocked patterned component containing a plurality of spaced open portions, rather than utilizing the aforementioned plastic composition alone. In this feature, an open mesh fabric of predetermined design is coated on its surface wth a plastic material selected from the group consisting of thermosettable plastics and thermoplastic material, in such a manner that the interstices remain uncoated or "open." As it is imperative that the interstices of the fabric remain free and unclogged, the fabric chosen should contain openings at least ⅛ inch square (preferably ³⁄₁₆ inch), and care should be taken to apply the plastic only to the strands of the fabric. This precaution will assure that the final two component material possess distinctly defined boundaries between its two areas.

The coated fabric is then subjected to a flocking system, preferably by electrostatic means, the flocked fabric is passed through a heating unit, cooled, and any excess flock is cleaned away. The electrostatic procedure is deemed most desirable for this embodiment because it is more likely to effect a uniformly upright position for the flock material, i.e. perpendicular to the mesh fabric, and therefore allows the interstices or spaces to remain open. Other flocking techniques, although acceptable, are less likely to achieve this desired result. The plastic material may be allowed to fuse or cure totally, however, partial gelling or incomplete fusing or curing is preferred. With the flock now secured in the plastic, the fabric is set into a liquid plastic base film selected from the group consisting of thermosettable plastics and thermoplastic resinous material, which has been applied on a second continuous releasable belt as disclosed above in my first embodiment. Plastic resin granules are applied to the entire composite, and these granules adhere only to the exposed areas in the plastic showing through the interstices in the fabric. A second heating application follows, at a temperature sufficiently regulated to completely fuse or cure the plastic in both layers, thereby uniting the coated fabric to the base film and also binding the application of resinous particles to the plastic base layer where it had been exposed. Finally, the product is cooled and cleaned.

The product produced by my novel process may be slightly modified in texture and consistency by the addition of a blowing agent to the various plastic components. The blowing agents may be included in either the first patterned deposit, the overall base layer, or in the plastic resin granules themselves. If a truly resilient effect is desired, the blowing agent may be added to all three materials, although the plastic particles are made more resilient by the inclusion of more plasticizer in the basic formula. The use of a blowing agent generates a more resilient ridge in the final material, thereby resulting in a softer consistency in the product. Several components have been utilized as blowing agents for vinyl plastisol, with azodicarbonamide, N,N′-dimethyl-N,N′-dinitrosoterephthalamide in white mineral oil (70:30 ratio) and N,N′-dinitrosopentamethylene tetramine in an inert filler (40:60 ratio) the most common.

Flock material of relatively wide composition can be employed in my process, including nylon, Orlon, Dacron, rayon, polypropylene, etc. Successful application of flock ranging from 1½ denier to 55 denier (the higher the number the coarser the fiber), and ranging in length from 20 mils to 300 mils has been achieved. The denier of the flock is generally increased with increasing flock length, however, the desired texture of the end product dictates these properties, and no fixed rule governs the choice of flock.

The resin of the resin granules or particles which are deposited on the plastisol may be the same as or different from the resin of the plastisol. The resin particles may be all of the same color (which may be the same as or different from the color of the base plastisol) or variously colored particles may be used, applied in admixture to give tweed or salt-and-pepper effects. Transparent or translucent particles and/or plastisol may be used. The choice of plastic for my resinous granules is virtually unlimited, and although plasticized vinyle is an ideal material, the granules can be made of polyethylene, polypropylene, styrene acrylonitrile copolymer resin, mechanical blends of styrene acrylonitrile resin and butadiene styrene rubber, graft copolymers of acrylonitrile styrene and butadiene (ABS resins) or high styrene butadiene resinous copolymers to mention a few.

The surface of the plastisol base layer is in a wet, ungelled state when the particles are applied so that the lower portions of the resin particles sink into or become embedded in the surface of the plastisol layer. However, the applied resin particles or granules do not sink completely into the plastisol, particularly if a thixotropic plastisol is used, but remain sticking up out of the plastisol layer to provide a desired rough texture, or grain-like or pebbled surface, which is a consequence of the size and shape of the protruding particles.

To prepare the irregular granules or particles relied upon to provide surface texture, the resin as supplied by the manufactuer in the form of a uniform fine powder (or sometimes in the form of molding pellets or chips) is first converted, by fusion, into a coherent bulk or mass which is thereafter fragmented or ground up in a suitable disintegrating or grinding device. Such fusion of the initial resin powder into a coherent mass is conveniently accomplished by working the resin powder (along with any desired compounding ingredients such as plasticizer, stabilizer, pigments, etc.) at elevated temperature (in excess of the fusion temperature) so as to produce a sheet or the like. The thus-produced coherent mass is thereafter fed to a conventional chopping device where it is subjected to impact and attrition to produce pre-fused particles or granules of suitable controlled size range. If desired the resin particles may be made up at least in part of pre-fused scrap or re-used resin.

For a fuller understanding of the nature and objects of my invention, reference should be had to the following detailed descriptions taken in conjunction with the accompanying drawing in which:

FIG. I represents a diagrammatic layout of the equipment for practicing the process of the invention; FIG. I runs from left to right commencing with a dispensing roll 1 from which the plastic material 4 is applied in a predetermined pattern on the continuous releasable surface 2. Flock is applied at station 3, and the flocked plastic is then partially fused or cured when passed through heater 5. Following a cooling procedure 6 and a vacuum cleaning step 7, the flocked component is then passed onto a second continuous releasable surface 8 where it is superimposed upon a thin wet plastic film 9 and subjected to a mechanical application of plastic resin granules 10. The total composite is then moved through a heater 11 where total fusion or curing takes place and the plastic granules are set in the base film, while the first flocked patterned component is also securely set in the base film layer. Lastly, the flock and plastic granule material is cooled 12 and the excess flock and granules removed at station 13 prior to removal of the finished material from the releasable surface.

FIG. II depicts a cross-sectional view of the finished material showing the base film layer 14, the plastic material used to form the pattern 15, the application of flock at point 16 and the application of plastic granules at 17.

FIG. III also represents a diagrammatic layout of the equipment for practicing the process of the invention; this time adapted to my second embodiment. Here, roll 18 contains the open mesh plastic coated fabric, shown in FIG. IV, which fabric is coated with a plastic material from dispenser 19. The coated fabric then travels through flocking station 20, heater 21, cooling system 22 and vacuum 23 where the flocked component depicted in FIG. V is produced. This flocked component is then passed onto the second continuous releasable surface which has been covered with a film of plastic material from point 24. The entire composite is now mechanically sprinkled with plastic granules at station 25 and then totally fused or cured at point 26, and after cooling 27 and cleaning 28 the finished material is removed from the releasable surface. The finished product is observed in FIG. VI.

To illustrate the novel methods of preparing flock and plastic particle decorated material, the following examples are herein given. It should be understood, however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

EXAMPLE 1

A high yield (thixotropic plastisol) (formulations to follow) composition is applied (see FIG. I) by means of a stencil roll moving transverse of the direction of travel of the carrier belt to provide interconnecting deposits of vinyl plastisol. This plastisol is comprised of the following ingredients:

| Ingredients: | Parts by weight |
|---|---|
| Polyvinyl chloride-plastisol (grade—Geon 121 brand) | 100 |
| Epoxidized soy bean oil (plasticizer) | 15 |
| Dioctyl phthalate (plasticizer) | 45 |
| Barium-cadmium-zinc (stabilizer) | 5 |
| Thickening agent (aluminum stearate) | 3 |

The high yield plastisol formulation is such that it has a high viscosity at low shear rates; generally such formulation should require at least 0.5 minute for a dissent of 4 inches in a Mobilometer (Gardner type) when using a 474.0 gram weight on a #1 disc. Preferably the #1 disc should take about 1 minute for a 4 inch dissent. The Gardner Mobilometer is described in "The National Paint Dictionary" (Second Edition, July 1942) by J.R. Stewart, at page 90.

Employing a stencil having a thickness of .018 inch a patterned deposit of high yield plastisol is placed onto the surface of the carrier belt in a thickness of .018 inch. Thereafter, a nylon flock, .10 inch long having a denier of 40, is electrostatically applied to the carrier belt, the nylon flock being embedded in, and retained in, only the surface of the high yield plastisol. The carrier belt is then passed through a heated oven so that the vinyl layer is heated to a temperature of 280° F. for 2 minutes to partially fuse the plastisol.

Thereafter, a second plastisol, of the same formulation, is spread as a continuous film layer onto the surface of a second continuous carrier belt, with the first partially fused patterned flocked vinyl then being laid onto the wet plastisol surface. To the patterned deposit of vinyl plastisol, while still wet, I applied a layer of prefused particles of plasticized vinyl. The formula for such particles or granules is provided below:

| Ingredients: | Parts by weight |
|---|---|
| Polyvinyl chloride | 100 |
| Di capryl phthalate | 25 |
| Diisodecyl phthalate | 25 |
| Epoxy plasticizer | 10 |
| Barium cadmium stabilizer | 3 |

The above components are blended on a hot mill, at temperatures above 300° F., to fuse the vinyl, the material then being sheeted off the mill and, after cooling, being sent to a pulverizer or granulator to provide the particle size desired. In this second operation, the vinyl particles adhere only to the exposed portion of the second layer. Thereafter, the carrier belt passes through a heating zone exposing the layers to a temperature of 390° F. for 3½ minutes to effect final fusion and permanent joining.

EXAMPLE 2

Where desired, the patterned layer can be made from a high yield vinyl plastisol containing a blowing agent. In this case, the formulation for the high yield formula disclosed in Example 1 is modified by the addition of 5 parts by weight of azodicarbonamide. The process set forth in Example 1 is otherwise repeated.

The base plastisol layer is made with the same high yield formulation as shown in Example 1 above (without any blowing agent added), or a conventional plastisol as described in Example 3 below can be used. The flock, vinyl particles and fusing conditions employed in Example 2 are identical with those set forth in Example 1.

Optionally, the continuous base layer may also be made cellular by incorporating in the high yield formulation, or in the conventional plastisol, 5 parts azodicarbonamide.

EXAMPLE 3

An open mesh nylon resin coated fabric, the openings being approximately 3/16 inch square, is coated on one surface with a high yield plastisol (formulation set forth in Example 1). The method for coating is a reverse roll coater, which will apply to the upper surface of the open mesh fabric a controlled amount of vinyl plastisol, in this case an 8 mil film layer, while leaving the openings in the fabric free of the coating. The coated fabric, supported by a continuous releasable carrier belt, is passed through an electrostatic flock applying station where a Dacron polyester flock, .060 inch in length having a denier of 8, is applied. Thereafter, the flocked open mesh fabric is heated to 280° F. for 1½ minutes to effect partial fusion of the plastisol.

A base layer of vinyl plastisol, .012 inch thick, is formed as a continuous film upon a second release surface carrier belt, by spreader bar bethods, 12 mils thick. The plastisol employed for this base film of the following formula:

| Ingredients: | Parts by weight |
|---|---|
| Polyvinyl chloride-plastisol (grade—Marvinol VR–50 brand) | 100 |
| Dioctyl phthalate (plasticizer) | 30 |
| Dioctyl azealate (plasticizer) | 12 |
| Epoxidized soy bean oil (plasticizer) | 10 |
| Barium-cadmium-zinc (stabilizer) | 2 |

The first partially fused flocked open mesh fabric is then laid onto (laminated) the wet surface of the continuous film of plastisol, the composite then being mechanically sprinkled with vinyl resin granules, as described in Example I, said granules being applied to the wet plastisol surface exposed through the open mesh fabric. The composite is then heated at a temperature of 390° F. for 3½ minutes to completely fuse both plastisol layers. The open mesh nylon fabric employed is approximately .020 inch thick.

Once again, optionally, a blowing agent, such as azodicarbonamide, can be added to the vinyl plastisol employed in producing the continuous base layer.

EXAMPLE 4

In this embodiment of my invention the patterned sheet is developed from a moving mixing head through a dispenser which lays down a continuous strip of polyurethane on the surface of a releasable type conveyor belt. This self-expanding room curing urethane composition is composed of the following ingredients:

| Ingredients: | Parts by weight |
|---|---|
| A polyurethane prepolymer which is the reaction product of toluene diisocyanate in polytetramethylene ether glycol, said prepolymer having NCO terminal groups | 100 |
| Surface active agent (silicone type) | .5 |
| Catalyst (triethylenediamine) | .2 |
| Water | 3.6 |
| Stannous octoate | .4 |

The continuous conveyor belt, with polyurethane deposited thereon, is passed through an electrostatic flocking station wherein a polypropylene flock, .10 inch in length and having a denier of 30, is supplied. The timing may be such that the polyurethane is in an unexpanded condition, a partially expanded condition, or a fully expanded condition (but still possessing a tacky surface) at the time that the block is applied. Curing, or cross-linking proceeds at room temperature.

A base film of .020 inch thick is then prepared using a vinyl plastisol of the formulation disclosed in Example 3 (base plastisol layer) by spreader means on a second conveyor belt. The previously prepared, cured (or substantially cured), and expanded flocked polyurethane patterned sheet is then laid into the wet surface of the plastisol. Thereafter the composite is passed through a mechanical sprinkling device wherein vinyl resin particles, as described in Example I, are applied to the still wet surface of the plastisol layer. The resulting flocked product is then passed through an oven bringing the composite to a temperature of 390° F. for 4 minutes to effect final fusing of the plastisol.

EXAMPLE 5

The following polyurethane composition is substituted for the plastisol base layer set forth in Example 4:

| Ingredients: | Parts by weight |
| --- | --- |
| A polyurethane prepolymer which is the reaction product of toluene diisocyanate and polytetramethylene ether glycol, said prepolymer having NCO terminal groups | 100 |
| Methylene dianiline | 6.5 |
| Methyl ethyl ketone | 165.0 |

The composition is spread coated onto a carrier belt with a releasable surface to provide uniform film thickness of .015 inch. After laying in a flocked patterned element, the laminate is provided with vinyl particles, as described above in Example 4, and the composite is heated at 150° F. for 5 minutes to flash off the solvent and accelerate the cure.

EXAMPLE 6

In this example, both the patterned sheet and base film components are made from thermosetting blends of epoxy resin and polysulfide rubber. A room temperature self curing composition of the following description is applied to the surface of a release surface conveyor belt as a strip by dispensing from a nozzle moving generally back and forth across the width of the conveyor belt:

| Ingredients: | Parts by weight |
| --- | --- |
| Epoxy resin Epon 828 (reaction product of bisphenol A and epichlorohydrin) | 60 |
| Polysulfide rubber (reaction product of an alkali polysulfide and dichlorodiethylformal) such as Thiokol LP-3 | 40 |
| Curing agent (triethylenetetramine) | 5 |

While still in a wet condition a polypropylene flock (having a length of .10 inch and a denier of 30) is applied by electrostatic means. To accelerate cure, the flocked patterned sheet is exposed to temperature of 150° F. for 10 minutes.

A second film, the base layer, of the same composition is formed on a second release surface conveyor belt, by conventional spreader means, in a thickness of .020 inch. The cured flocked grid deposit is laminated to the wet surface of the base film, and the composite is thereafter passed through a mechanical sprinkler station in which a vinyl resin granule, as described in Example I, is deposited thereon; the vinyl granules being retained only in the exposed portion of the base layer. Thereafter, the deposit is passed through an oven, heating the total composite for 10 minutes at a temperature of 150° F.

Having thus described my invention, what I claim and desire to protect by Letters Patent is:

1. The process of producing a flock and plastic resin granule decorated material which comprises applying a plastic material selected from the group consisting of thermosettable plastics and thermoplastic resinous material in a predetermined pattern containing a plurality of spaced open portions on a continuous releasable surface, applying flock to the plastic material, partially fusing or curing the plastic to secure the flock held therein, superimposing the flocked component on a base film layer of wet plastic material selected from the group consisting of thermosettable plastics and thermoplastic resinous material, sprinkling plastic granules on the entire composite, and applying heat to set the granules in the exposed plastic film and also to affix the first flocked component to the second plastic layer.

2. The process of claim 1, wherein the plastic granules are vinyl resin granules.

3. The process of claim 1 wherein the thermosettable plastic is a polyurethane composition.

4. The process of claim 1 wherein the thermoplastic resinous material is a vinyl plastisol composition.

5. The process of claim 1 wherein the plastic pattern contains a blowing agent.

6. The process of claim 1 wherein the base film layer contains a blowing agent.

7. The process of claim 1 wherein the predetermined pattern is achieved through the application of a plastic material selected from the group consisting of thermosettable plastics and thermoplastic resinous material over a sheet of resin coated open mesh fabric, the plurality of spaced open portions taking the form of the interstices of the fabric.

8. The process of claim 7 wherein the thermoplastic resinous material is a vinyl plastisol composition.

9. A flock decorated material comprising a base layer composed of a plastic material selected from the group consisting of thermosettable plastics and thermoplastic resinous material, a resin coated open mesh fabric affixed to said base layer, an application of flock adhering to the open mesh fabric and an application of plastic granules attached to the base layer through the interstices of the open mesh fabric.

10. A flock decorated material as set forth in claim 9, wherein the plastic granules are vinyl resin granules.

References Cited

UNITED STATES PATENTS

| | | | |
| --- | --- | --- | --- |
| Re. 23,741 | 11/1953 | Summers | 161—63 XR |
| 2,784,630 | 3/1957 | Koprow et al. | 117—25 XR |
| 2,895,389 | 7/1959 | Nagin | 117—33 XR |
| 2,981,588 | 4/1961 | Haber | 117—25 XR |
| 3,410,747 | 11/1968 | Orr | 161—64 |

ROBERT F. BURNETT, Primary Examiner

R. H. CRISS, Assistant Examiner

U.S. Cl. X.R.

117—25, 33; 156—246, 279; 161—63, 89